US008065740B2

(12) United States Patent
Rive et al.

(10) Patent No.: US 8,065,740 B2
(45) Date of Patent: Nov. 22, 2011

(54) MANAGING A SOFTWARE ITEM ON A MANAGED COMPUTER SYSTEM

(75) Inventors: Russell S. Rive, Palo Alto, CA (US); Peter Joshua Rive, San Francisco, CA (US)

(73) Assignee: Dell Marketing USA, L.P., Round Rock, TX (US)

( * ) Notice: Subject to any disclaimer, the term of this patent is extended or adjusted under 35 U.S.C. 154(b) by 0 days.

(21) Appl. No.: 12/580,065

(22) Filed: Oct. 15, 2009

(65) Prior Publication Data

US 2010/0037316 A1    Feb. 11, 2010

Related U.S. Application Data

(62) Division of application No. 10/371,319, filed on Feb. 20, 2003, now Pat. No. 7,627,902.

(51) Int. Cl.
*G06F 7/04* (2006.01)
(52) U.S. Cl. .......................................... 726/26; 726/22
(58) Field of Classification Search .................... 726/22, 726/26–33; 713/189, 191, 193, 194, 187, 713/165, 166; 717/168–173, 174–178; 705/57–59, 705/51
See application file for complete search history.

(56) References Cited

U.S. PATENT DOCUMENTS

| | | |
|---|---|---|
| 5,483,658 A | 1/1996 | Grube et al. |
| 5,655,081 A | 8/1997 | Bonnell et al. |
| 5,708,709 A | 1/1998 | Rose |
| 5,742,762 A | 4/1998 | Scholl et al. |
| 5,790,664 A | 8/1998 | Coley et al. |
| 5,908,469 A | 6/1999 | Botz et al. |
| 5,923,850 A | 7/1999 | Barroux |
| 5,925,127 A | 7/1999 | Ahmad |
| 5,935,246 A | 8/1999 | Benson |
| 5,953,532 A * | 9/1999 | Lochbaum ..................... 717/176 |
| 5,968,116 A | 10/1999 | Day et al. |
| 5,996,010 A | 11/1999 | Leong et al. |
| 5,999,179 A | 12/1999 | Kekic et al. |
| 6,006,333 A | 12/1999 | Nielsen |
| 6,008,737 A | 12/1999 | Deluca et al. |
| 6,009,274 A | 12/1999 | Fletcher et al. |
| 6,021,438 A | 2/2000 | Duvvoori et al. |
| 6,044,465 A | 3/2000 | Dutcher et al. |
| 6,088,515 A | 7/2000 | Muir et al. |
| 6,144,739 A | 11/2000 | Witt et al. |
| 6,145,001 A | 11/2000 | Scholl et al. |
| 6,243,468 B1 | 6/2001 | Pearce et al. |
| 6,282,711 B1 * | 8/2001 | Halpern et al. ............... 717/175 |
| 6,289,378 B1 | 9/2001 | Meyer et al. |
| 6,366,930 B1 * | 4/2002 | Parker et al. .......................... 1/1 |

(Continued)

OTHER PUBLICATIONS

"U.S. Appl. No. 10/071,319, filed May 4, 2009 to Advisory Action mailed Apr. 7, 2009", 12 pgs.

(Continued)

*Primary Examiner* — Nirav B. Patel
(74) *Attorney, Agent, or Firm* — Hamilton & Terrile, LLP; Robert W. Holland

(57) ABSTRACT

A method and system is provided of managing a current software item on a managed computer system connectable to a management computer system via a computer network. The method includes identifying, using an agent application, the current software item on the managed computer system, identifying if the current software item is an unauthorized software item; and selectively disabling the unauthorized software item.

10 Claims, 11 Drawing Sheets

U.S. PATENT DOCUMENTS

| | | | |
|---|---|---|---|
| 6,381,631 | B1 | 4/2002 | van Hoff |
| 6,446,211 | B1 | 9/2002 | Colvin |
| 6,487,586 | B2 | 11/2002 | Ogilvie et al. |
| 6,502,124 | B1 * | 12/2002 | Shimakawa et al. ........... 709/203 |
| 6,574,729 | B1 * | 6/2003 | Fink et al. .......................... 713/1 |
| 6,578,199 | B1 | 6/2003 | Tsou et al. |
| 6,631,521 | B1 | 10/2003 | Curtis |
| 6,687,902 | B1 * | 2/2004 | Curtis et al. ................... 717/175 |
| 6,898,286 | B2 | 5/2005 | Murray |
| 6,948,166 | B2 * | 9/2005 | Barfield et al. ................ 717/174 |
| 6,981,252 | B1 * | 12/2005 | Sadowsky ...................... 717/176 |
| 7,069,595 | B2 | 6/2006 | Cognigni et al. |
| 7,143,067 | B1 * | 11/2006 | Cheston et al. .................. 705/59 |
| 2001/0011253 | A1 * | 8/2001 | Coley et al. ...................... 705/59 |
| 2003/0131094 | A1 | 7/2003 | Awada et al. |
| 2003/0191911 | A1 | 10/2003 | Kleinschnitz, Jr. et al. |
| 2004/0064731 | A1 | 4/2004 | Nguyen et al. |
| 2004/0098446 | A1 | 5/2004 | Styles et al. |
| 2005/0120113 | A1 | 6/2005 | Bunch et al. |

OTHER PUBLICATIONS

"U.S. Appl. No. 10/371,319, Advisory Action mailed Mar. 22, 2007", 3 pgs.

"U.S. Appl. No. 10/371,319, Advisory Action mailed Mar. 31, 2008", 3 pgs.

"U.S. Appl. No. 10/371,319, Advisory Action mailed Apr. 17, 2009", 3 pgs.

"U.S. Appl. No. 10/371,319, Final Office Action mailed Jan. 4, 2007", 13 pgs.

"U.S. Appl. No. 10/371,319, Final Office Action mailed Jan. 24, 2008", 13 pgs.

"U.S. Appl. No. 10/371,319, Non Final Office Action mailed May 14, 2007", 12 pgs.

"U.S. Appl. No. 10/371,319, Non Final Office Action mailed Jul. 17, 2006", 10 ps.

"U.S. Appl. No. 10/371,319, Non-Final Office Action mailed Jul. 25, 2008", 11 Pgs.

"U.S. Appl. No. 10/371,319, Notice of Allowance mailed Jul. 15, 2009", 11 pgs.

"U.S. Appl. No. 10/371,319, filed Aug. 20, 2007 to Non Final Office Action mailed May 14, 2007", 15 pgs.

"U.S. Appl. No. 10/371,319, filed Mar. 5, 2007 to Final Office Action mailed Jan. 4, 2007", 14 pgs.

"U.S. Appl. No. 10/371,319, filed Mar. 30, 2009 to Final Office Action mailed Feb. 3, 2009", 12 pgs.

"U.S. Appl. No. 10/371,319, filed Oct. 17, 2006 to Non Final Office Action mailed Jul. 17, 2006", 11 pgs.

"U.S. Appl. No. 10/371,319, filed Nov. 13, 2008 to Non-Final Office Action mailed Jul. 25, 2008", 11 pgs.

"U.S. Appl. No. 10/371,319, Restriction Requirement mailed Nov. 1, 2007", 6 pgs.

"U.S. Appl. No. 10/371,319, Final Office Action mailed Feb. 3, 2009", 11 pgs.

"U.S. Appl. No. 10/371,319, filed Mar. 3, 2008 to Final Office Action mailed Jan. 24, 2008", 11 pgs.

"U.S. Appl. No. 10/371,319, filed Nov. 26, 2007 to Restriction Requirement Office Action mailed Nov. 1, 2007", 9 pgs.

* cited by examiner

Fig. 9

MANAGING A SOFTWARE ITEM ON A MANAGED COMPUTER SYSTEM

CLAIM OF PRIORITY

This application is a divisional of U.S. patent application Ser. No. 10/371,319, filed Feb. 20, 2003, which is issued as U.S. Pat. No. 7,627,902 on Dec. 1, 2009, which is incorporated herein by reference in its entirety.

FIELD OF THE INVENTION

The present invention relates generally to the provision of computer related services. More specifically, the invention relates to a method and system for uninstalling an unauthorized software item on a managed computer.

BACKGROUND OF THE INVENTION

The deployment of computer systems in the workplace has become increasingly widespread, and computer systems have become indispensable tools for workers in most industries. The challenge of providing adequate management and support for such computer systems has paralleled this deployment. Organizations with more than a few computers may employ an Information Technology (IT) administrator to manage computer systems and networks of the organization. An IT administrator is typically burdened with a large number of tasks and responsibilities relating to such computer systems and networks. For example, the IT administrator, and supporting staff, are typically responsible for the installation and set up of computer systems and networks within an organization, the upgrading and maintenance of installed computer systems, and responding to service requests from users within the organization.

Although technology has in recent years driven the cost of computer systems down, service and support costs continue to escalate. One ongoing maintenance task that contributes to escalating costs is the removal of unauthorized software items from managed computer systems.

SUMMARY OF THE INVENTION

A method and system is provided of managing at least one current software item on a managed computer system connectable to a management computer system via a computer network. The method includes identifying, using an agent application, the at least one current software item on the managed computer system; identifying if the at least one current software item is an unauthorized software item; and selectively disabling the unauthorized software item.

The invention extends to a machine-readable medium for storing instructions that, when executed by the machine, cause the, machine to execute any one of the methods described herein.

BRIEF DESCRIPTION OF THE DRAWINGS

The present invention is illustrated, by way of example, and not limitation in the figures of the accompanying drawings, in which like references indicate similar elements unless otherwise indicated.

In the drawings,

FIG. 9 illustrates an exemplary embodiment of a user interface to create/edit an account package;

DETAILED DESCRIPTION

A method and system for uninstalling an unauthorized software item from a managed computer is described. In the following description, for purposes of explanation, numerous specific details are set forth in order to provide a thorough understanding of the present invention. It will be evident, however, to one skilled in the art that the present invention may be practiced without these specific details.

In general, embodiments described below feature a management system that allows an IT administrator to manage services for multiple managed computer systems including the identification and disabling of unauthorized or unapproved software items that are present on the managed computer systems. In one embodiment the IT administrator identifies unauthorized software items by creating an allow or disallow list from an administrative console for each managed computer system. Further, the IT administrator, may schedule periodic determination of inventories of software items on at least one of the managed computer systems and, in an automated fashion, selectively disable any unauthorized software item identified on the managed computer system.

Figure 1:
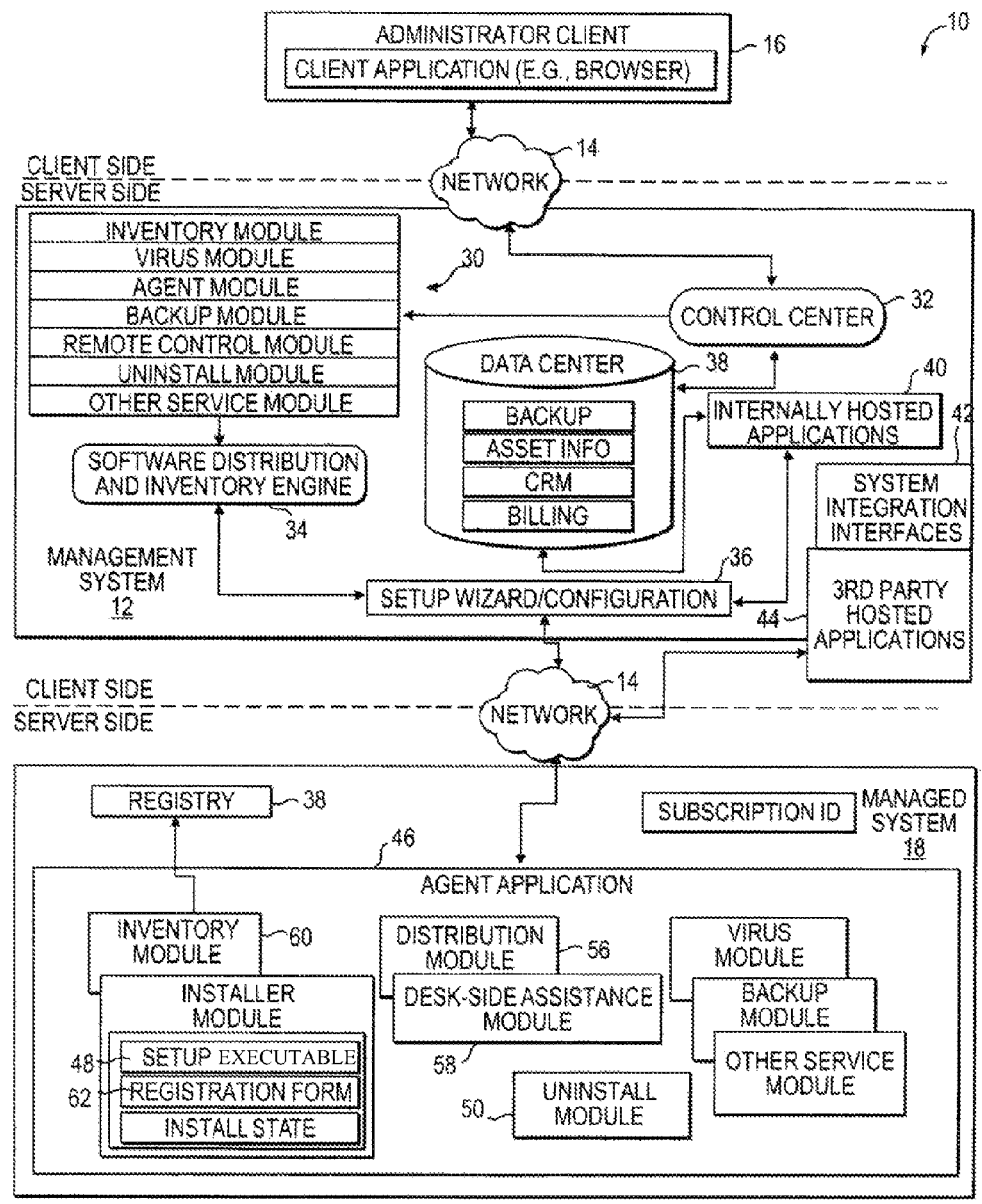
FIG. 1 is a block diagram illustrating a management system, according to an exemplary embodiment of the present invention, to manage services for multiple managed systems.

FIG. 1 is a block diagram illustrating a system 10, according to an exemplary embodiment of the present invention, to manage services for multiple managed computer systems. Included within the exemplary system 10 is a management system 12, which is optionally coupled by a network 14 (e.g., the Internet) to an administrator client 16 and one or more managed systems 18. The managed systems 18 may each be any one of a number of types of devices or systems including, but not limited to, a personal computer (PC), workstation, Personal Digital Assistant (PDA), set-top box (STB), cellular telephone, network device (e.g., switch, router, or bridge) or any other device capable of executing software.

In one embodiment, the management system 12 provides fault analysis, inventory analysis, security management, performance analysis, software upgrades, software uninstall or the like to any one or more of the managed systems 18. Thus, the management system 12 may include a number of applications and engines integrated into a single framework that utilizes an open architecture and industry standards to provide an Information Technology (IT) management platform. Service modules may be hosted at an operator of the management system 12 (e.g., a Managed Service Provider (MSP)), or may be hosted by a third-party vendor. The management system 12, in one embodiment, utilizes web services (e.g., the Simple Object Application Protocol (SOAP)), to facilitate systems integration.

Figure 2:
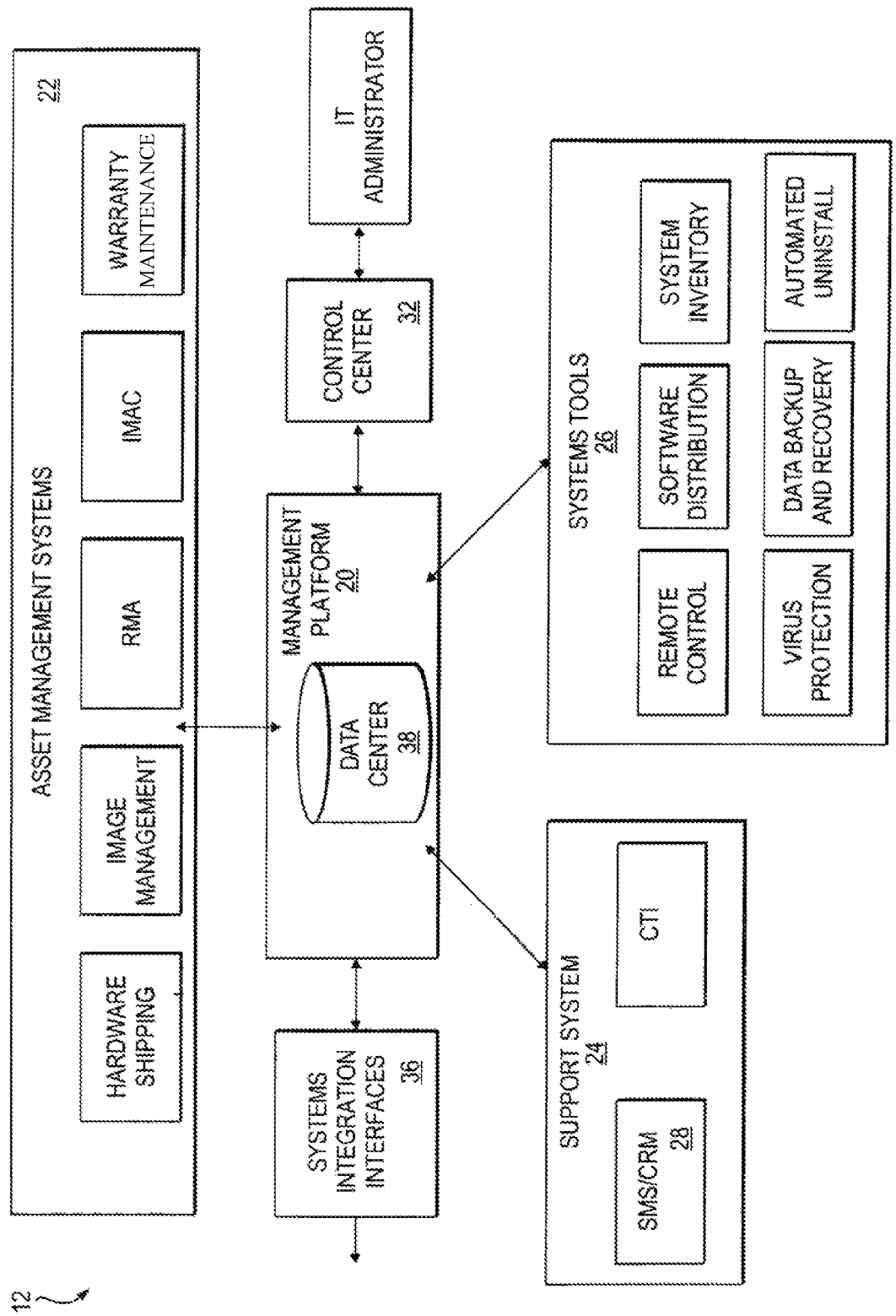
FIG. 2 is a block diagram illustrating a conceptual representation of the management system, according to an exemplary embodiment of the present invention.

FIG. 2 is a block diagram illustrating a conceptual representation of the management system 12, according to an exemplary embodiment of the present invention. The management system 12 may conceptually be viewed, in one exemplary embodiment, as providing a management platform 20 that includes asset management systems 22 that provide access to a range of asset management functions, a support system 24 to assist IT administrators in providing and managing services to the managed systems 18 and a set of systems tools 26.

The asset management functions provided by the asset management systems 22 may include physical asset (e.g., hardware and software) information (e.g., location, asset inventory, etc.), financial information (e.g., procurement, ownership) and warranty/service information (e.g., entitlements, service history, etc.).

Turning now specifically to the support system 24, in one exemplary embodiment, the support system 24 assists an IT administrator (e.g., a solutions analysis) in providing service in two areas, including service request management and telephony systems. The support system 24 includes a service management system 28, or a Customer Relationship Management (CRM) system, to manage service requests and service workload. The CRM system may operate as a subscription component and be updated to reflect an entitlement (e.g., as a result of a subscription agreement) of a particular managed system 18 to a number of service modules 30 (see FIG. 1) responsive to a distribution request.

The service management system 28 may be utilized to service requests for compliance with a service level agreement and also to provide managers with relevant statistics (e.g., problem resolution times, open service requests, etc.). In addition, custom workflow rules may be defined within a graphical environment to create appropriate responses for a range of situations.

Telephony infrastructure (e.g., Computer Telephony Integration (CTI) infrastructure) may facilitate any number of features, such as real-time fail-over across distributed call centers, detailed call metrics at granular levels, Computer Telephony Integration (CTI) for call center efficiency, centralized call routing rules, and custom Interactive Voice Recognition (IVR) on a per number basis.

Systems tools 26, in one embodiment, reside on the managed system 18 and are responsible for a number of services to the managed systems 18 (e.g., self-maintenance, system protection and disaster recovery). The systems tools 26 may be utilized by an end user of the managed system 18 or by support staff of a managed service provider to assist in problem resolution. In one embodiment of the invention, the systems tools 26 provides automated uninstall functionality for automatically disabling software items on the managed system 18, as discussed in more detail below.

Returning now to the high-level architectural representation of the system 10 provided in FIG. 1, a more detailed description of the architecture will now be provided. The management system 12, in one exemplary embodiment, is shown to include a control center 32, a software distribution and inventory engine 34, a configurator 36, a data center 38, a collection of internally-hosted applications 40, and system integration interfaces 42 that enable access to one or more third-party hosted applications 44.

Considering first the control center 32, in one exemplary embodiment the control center 32 includes a secure web application that allows an IT administrator to specify, configure, and view services that are being delivered to multiple managed systems 18. For example, the control center 32 may allow an IT administrator to access desktop and service data operations, e.g. to perform system diagnostics queries, initiate operating system tasks, or the like. Analytical services and reports are driven off data stored in the data center 38, which collects data from multiple applications within the management system 12 and stores the collected data in a database scheme suited for standard and custom reports.

The control center 32 may enable an IT administrator to manage assets and services by issuing queries across system inventory (e.g., hardware, software and services (e.g., network access)), users, physical location and cost centers, manage software licenses, and access new system rollout information. An IT administrator may also query service request information (e.g., response times), and update and create service requests. In addition, the control center 32 allows an IT administrator to manage deployment of an agent application 46 to multiple managed systems 18 and to create new deployment configurations. The control center 32 also provides reporting and administrative capabilities to an IT administrator. For example, the control center 32 may be able to generate graphical reports, and also deliver exportable data for additional analysis.

In summary, an IT administrator can log into the control center 32, and view the status of multiple managed services, and remove and modify selected services from selected managed systems 18. In one embodiment, the IT administrator may accomplish this by authoring appropriate scripts which are executed to provide the desired service.

FIG. 1 shows the control center 32 as communicating a service input, received from an IT administrator, that identifies a number of services each of which may be enabled by the respective service module 30 to the software distribution and inventory engine 34.

The software distribution and inventory engine 34, responsive to group and services inputs, identifies and communicates to the configurator 36 a collection of service modules 30, which enable the provision and management of services, to be installed on one or more of the managed systems 18. In one embodiment, the agent application 46, and the collection of service modules 30 when downloaded, onto the managed computer system 18, may thus define hardware modules or components of the managed computer system 18. The configurator 36, in one embodiment, operates to manage the configuration of the services subscribed by, and delivered to, the managed system 18. To this end, the agent application 46, installed on each managed system 18, operates in conjunction with the configurator 36. Specifically, at an initial registration of a new managed system 18, the configurator 36 runs a "setup wizard" or a setup executable 48 to gather information regarding the managed system 18 (e.g., user information), and creates an account with which the managed system 18 is associated. Multiple managed systems 18 may be associated with the single account of an IT administrator. The configurator 36, following initial registration, also downloads the setup executable 48 to the managed system 18, whereafter communications can be established between the configurator 36 and the setup executable 48 for the purposes of configuring and installing further services. As is described, the configurator 36 receives a list of services that are to be managed from the control center 32.

Following completion of an initial installation, should an IT administrator request additional services to be installed on the managed system 18, the configurator 36 operates to install and register the appropriate services. The configurator 36 receives an instruction that includes a system identifier and services that need to be installed on the managed system 18 from the control center 32, as inputted by IT administrator.

The configurator 36 allows for service configuration modules, or service modules 30 shown in FIG. 1 to form part of the agent application 46, to be incorporated within the agent application 46. Such service modules 30 may include, for example, backup, virus protection, email, Internet connectivity, automated uninstall, and desk-side assistance/customer service modules. Each module, in one embodiment, includes the ability to create a new account on a service server that may host a module (e.g., an internally-hosted application 40 or a third-party hosted application 44).

Once an account is created on a service server, the appropriate service is installed and configured on the managed system 18. To this end, the appropriate service module 30 is sent to the managed system 18 (e.g., by sending a command line from the control center 32 to the software distribution and inventory engine 34 to send the appropriate module or package to the managed system 18 via the configurator 36. In one embodiment, the software distribution and inventory engine 34 sends an uninstall module 50 to the managed system 12 for automatically uninstalling unauthorized software items e.g., applications and/or files uninstalled on the managed system 18 that are not authorized by the IT administrator.

Once the appropriate service module 30 is downloaded, the configurator 36 configures the service module 30 to conform to the account that it previously created on the service server. When the control center 32 queries the databases of the service server that includes the account information, the control center 32 may automatically detect that a new service has been stored on the managed system 18, and indicate this installation. The control center 32 may also be responsible for advising a financial system (not shown) that a new service has been added to the managed system 18, and the appropriate account (e.g., an account associated with a particular administrator) will be recognized as the billing account for the newly installed service. While the provision and management of the service is described above as being facilitated by the installation and/or execution of an appropriately configured service module 30 on the managed system 18, it will be appreciated that certain services may not require such an installation and/or execution, and could be provided from a remote location and/or without a service module.

FIG. 1 also illustrates the data center 38 as maintaining information to support the asset management systems 22, the support system 24, and the systems tools 26, described above with reference to FIG. 2.

Figure 3:
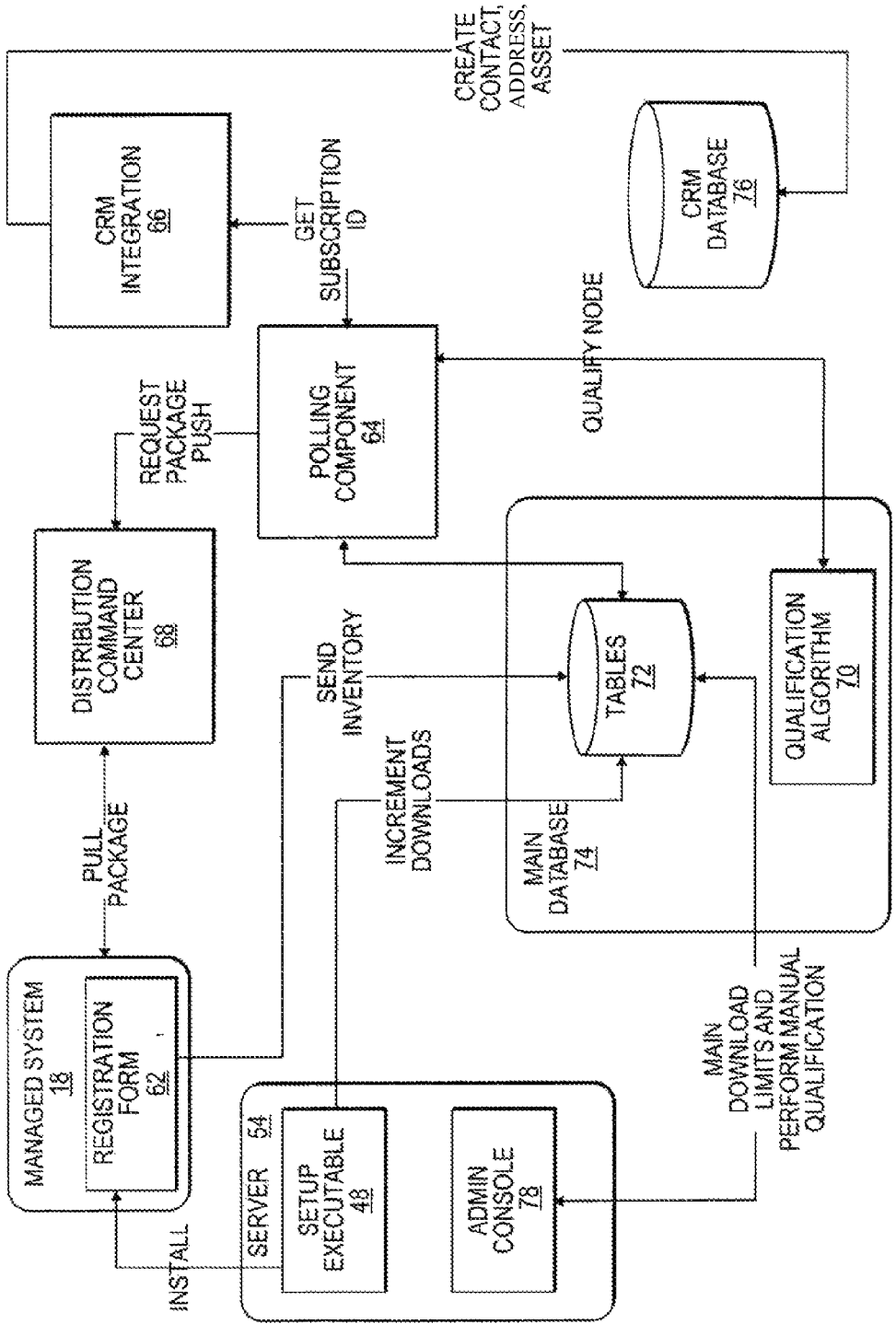
FIG. 3 is a block diagram illustrating further details of the software architecture (as opposed to the service architecture) of the management system, according to an exemplary embodiment of the present invention.

FIG. 3 is a block diagram illustrating further details of the software architecture (as opposed to the service architecture) of the management system 12, according to an exemplary embodiment of the present invention. The management system 12, illustrated in FIG. 3, operates to deploy and integrate a number of services to a managed system 18. Such services may be, in one exemplary embodiment, provided partially by an operator of the management system 12 and provided partially by third-party vendors.

The management system 12 may include a number of different components executing on different systems. It should be noted that the components illustrated in FIG. 3 are not necessarily physical components (e.g., which have interfaces accessible through an API), but may be components described for the purposes of facilitating understanding of exemplary software architecture. However, each of the components illustrated in FIG. 3 may ultimately be implemented in code within the management system 12.

The software architecture of the management system 12, as illustrated FIG. 3 and according to an exemplary embodiment, may be a combination of third-party applications, C++ service applications, scripts (which may define tasks included in an envelope), stored procedures and active server pages. Each of the components illustrated in FIG. 3 will now be discussed in further detail.

A setup executable 48 is stored on a server 54, and is downloaded to, and executes on, a managed system 18 to install one or more service modules 30 (e.g., a distribution module 56, a desk-side assistance module 58, the uninstall module 50 and an inventory module 60 as shown in FIG. 1) on the managed system 18. For example, the distribution module 56 may be a software component developed by Mobile Automation (e.g., the Mobile Automation 2000 Enterprise Edition). The desk-side assistance module 58 may be supplied by Control-F1, or Microsoft Corp. (e.g., NetMeeting) and may include system diagnostic capabilities. In addition, the setup executable 48 may operate to install a "help" window, and insert appropriate short cuts for assistance and information into a "Start Menu" on the managed system 18.

In one embodiment, the setup executable 48 is account-specific, in that every account has a different binary account number. Each account furthermore may have a finite number of downloads, which number is maintained in the data center 38. The setup executable 48, as described above, also displays a user registration form 62 to a user of the managed system 18 during installation, which takes control of and directs the setup procedure performed by the setup executable 48.

Returning to FIG. 3, a polling component 64, which in one embodiment may include a polling script, monitors all new registrations of managed systems 18, obtains a subscription identifier from a CRM integration application 66, pushes packages (or modules) to support additional services to the managed system 18 via a distribution command center 68, and provides emails to a user of the managed system 18, or an appropriate administrator, regarding updates to the managed system 18. The obtaining of a subscription identifier by the polling component 64 may be contingent on the managed system 18 qualifying to receive delivery of one or more services. To this end, the polling component 64 interacts with a qualification algorithm 70 to qualify a managed system 18. In one embodiment, the polling component 64 makes calls to the qualification algorithm 70 (e.g., a stored procedure). If the qualification succeeds, the subscription identifier is created and a services module 30 (or package) is pushed to the managed system 18. The user of the managed system 18 is then sent an email including the subscription identifier associated with the managed system 18 and/or the user.

The qualification algorithm 70, in one exemplary embodiment, is a stored procedure that uses inventory information retrieved from the managed system 18 (e.g., inventory files and machine tables) in order to assess whether the managed system 18 qualifies for the provision and management of one or more services by the management system 12. For example, the inventory information may be matched against one or more qualification rules to determine whether the managed system 18 can be supported by the management system 12, and also whether one or more specific services can be provided and managed by the management system 12. To this end, different qualification rules may be associated with different services, depending upon the requirements to provide the respective services.

In one embodiment, the inventory information utilized by the qualification algorithm 70 to qualify the managed system 18 may be stored in an appropriate table 72 within a main database 74 of the data center 38. As discussed above, the inventory module 60 installed on the managed system 18 may, as part of the operations performed under the setup executable 48, harvest software, hardware and services (e.g., regarding existing services to which the managed system 18 has access) inventory information pertaining to the managed system 18. This information is then communicated to the management system 12 for storage within the table 72. Accordingly, the qualification algorithm 70 may access the table 72 in order to obtain the inventory information to qualify the managed system 18. In an alternative embodiment, the qualification algorithm 70, in response to a request for qualification from the polling component 64, retrieves the inventory information directly from the managed system 18. In this case the inventory information is not necessarily stored within the main database 74. In the embodiment in which the inventory information is stored within the table 72, the main database 74 may be regarded as including a central inventory database that is accessed by the qualification algorithm 70.

In addition, the automated uninstall functionality, in one exemplary embodiment, also uses inventory information retrieved from the managed system 18 in order to assess whether an unauthorized software item is present on the managed system 18. As will be discussed in more detail below, in one embodiment inventory information is matched against unauthorized software information to identify and optionally disable unauthorized software items automatically without human intervention.

FIG. 3 also illustrates the management system 12 as including the CRM integration application 66 that is responsible for generation of a subscription identifier responsive to a request from the polling component 64. In one embodiment, the polling component 64 posts all fields for which information was received via the registration form 62 to an Active Service Page (ASP). The ASP page makes a call to a Java-built object, which inserts the information into a CRM database 76 associated with the CRM integration application 66.

The CRM integration application 66 is responsible for a generation of a subscription identifier, and also for the creation and maintenance of contact and account records for a customer of the management system 12. For example, a single customer (e.g., corporation) may have specific contact information, as well as a single account with which a number of managed systems 18 are associated.

It should also be noted that the installation of the agent application 46 may be tightly integrated with the CRM database 76 by the CRM integration application 66. Specifically, in certain embodiments, the CRM integration application 66 automatically generates "trouble tickets" at the management system 12 if any part of the installation and/or configuration process fails or experiences difficulties. In an exemplary embodiment, following the call from the ASP page, the ASP page returns a single string including the subscription identifier to a HTTP response buffer.

FIG. 3 also illustrates the server 54 as supporting an administrative console 78 that, according to an exemplary embodiment, includes a set of user interfaces that enable an administrator of the management system 12 to manage accounts and downloads, and manually to force qualification, for example. Specifically, in one embodiment, Active Server Pages (ASP's) constitute this component and allow an administrator within the management system 12 to maintain account downloads (e.g., set a maximum number of downloads, view a download log, etc.) and manually to force qualification for one or more managed systems 18 if such managed systems 18 were failed by the qualification algorithm 70. When a manual qualification is forced, the appropriate ASP updates appropriate tables 72 within the main database 74 to indicate the qualification. The polling component 64 then recognizes the manually forced qualification, and sends the appropriate services application 30 to the appropriate managed system 18.

Regarding the various services that may be delivered to, and managed for, a managed system 18, the provision and management of each service may be facilitated by the installation of the appropriate service module 30 on the managed system 18. Each of the service modules 30 may include a dedicated installer, and be distributed either as part of an initial setup, or may be pushed to the managed system 18 subsequent to qualification of the managed system 18. The subsequent pushing of a service module 30 to the managed system 18 may be part of an initial configuration operation performed by the management system 12, or as part of a subsequent request from a customer for installation and/or provision of the relevant service. It should also be noted that, in one embodiment, the installation of service modules 30 might require administrative privileges under an operating system of the managed system 18. Specifically, the administrative privileges that may be required are privileges to write to a disk drive of the managed system 18, to install a module, to update a registry file, and to create services on the managed system 18.

Figure 4:
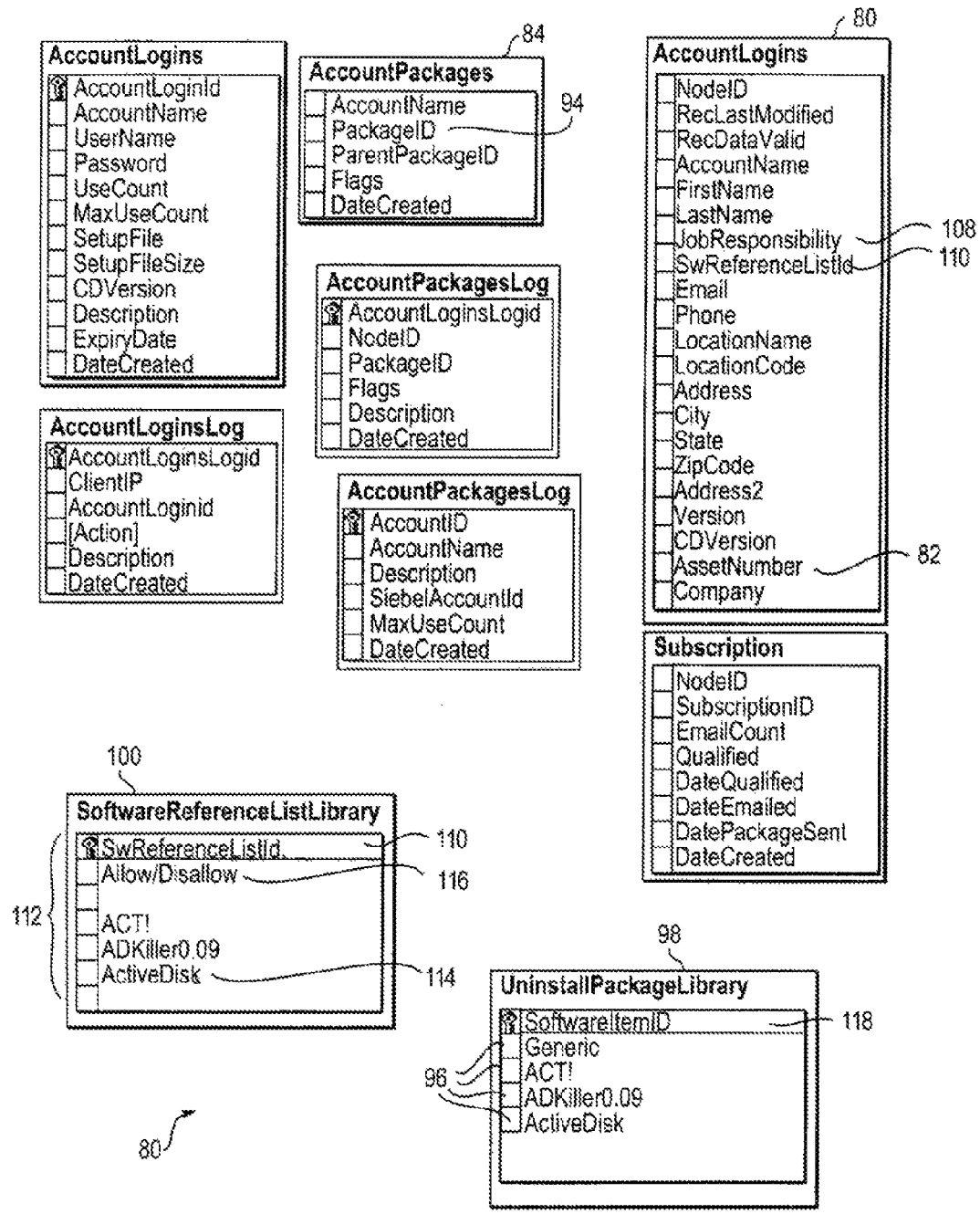
FIG. 4 is a database schema diagram illustrating exemplary tables that may be maintained within a main database so as to enable the management system to manage multiple managed systems and to provide services to the managed systems for disparate service providers.

FIG. 4 is a database schema diagram illustrating the exemplary tables 72 that may be maintained within the main database 74 so as to enable the management system 12 to manage multiple managed systems 18 and the provision of services to the managed systems 18 for disparate service providers. The inventory module 60 may populate a registry asset information table 80, included within the table 72, to associate an asset number 82 with each managed system 18, each asset number 82 identifying a particular software or hardware asset. An account packages table 84 maintains a record of service modules 30 that have been distributed to, and installed on, one or more managed systems 18 associated with a particular account.

Figure 5:
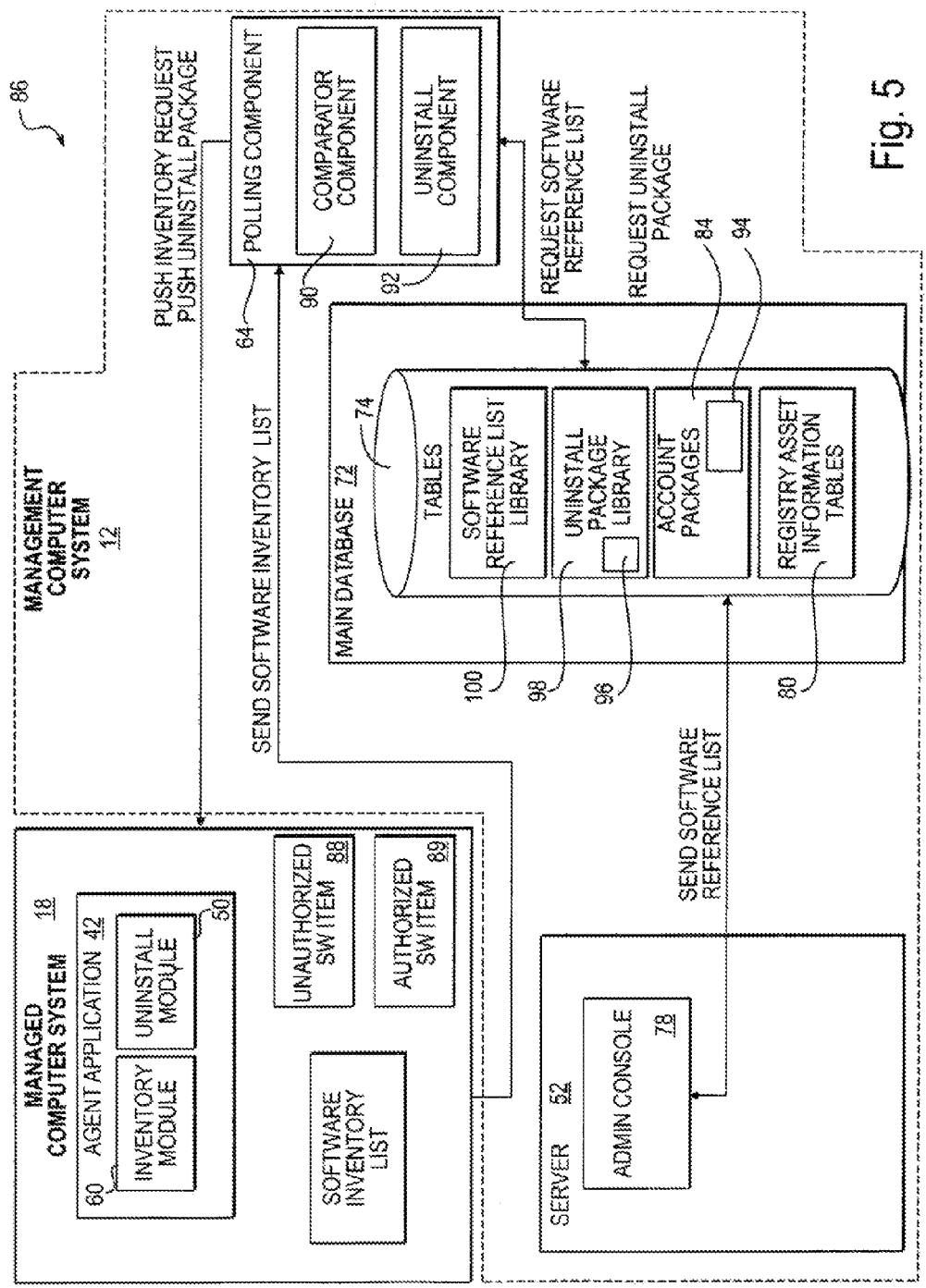
FIG. 5 is a block diagram of a system to identify and disable or remove an unauthorized software item, according to an exemplary embodiment of the present invention.

As mentioned above, the system 10 in one embodiment disables unauthorized software items (e.g., MP3 files, JPEG files, software applications, or the like) that may be present on the managed system 18. FIG. 5 is a schematic block diagram of a system 86, in accordance with an exemplary embodiment of the invention, to identify and disable or remove the unauthorized software items. The system 86 includes a managed computer system 18 and a management computer system 12 which, in one embodiment of the invention, substantially resembles the systems 12 and 18 of the system 10.

The managed computer system 18 includes an agent application 42 that includes an inventory module 60 and an uninstall module 50. The inventory module 60 identifies each exemplary current software item on the managed computer system 18. Current software items on the managed computer system 18 may take the form of unauthorized software items 88 and/or authorized items 89 on the managed computer system 18. After reading current software items, the inventory module 60 generates a software inventory list that lists all software on the particular managed computer system 18. The inventory module 60 may then report the software inventory list to the polling component 64 on the management computer system 12.

Figure 10:
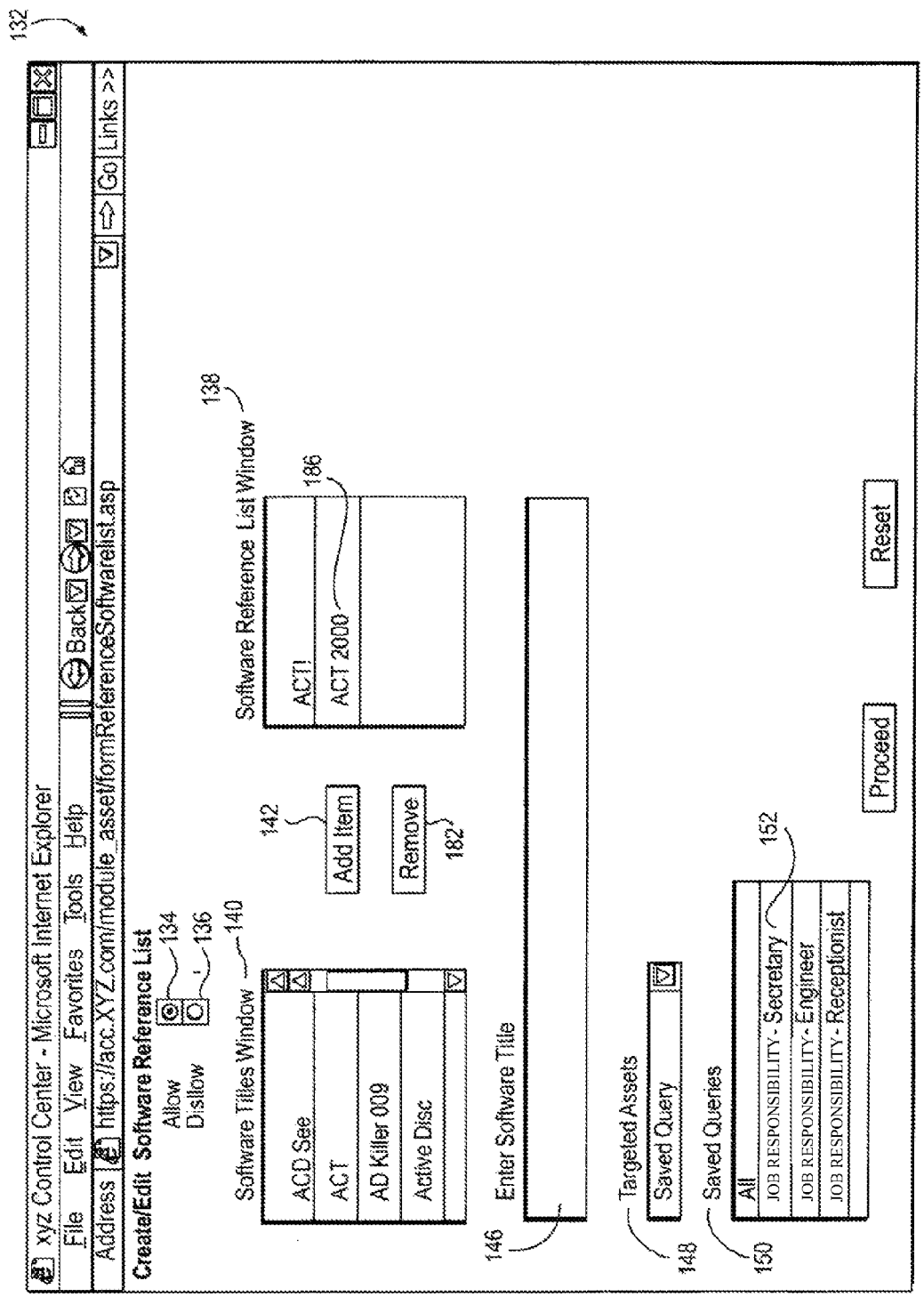
FIG. 10 illustrates an exemplary embodiment of a user interface to create/edit a software reference list.

The management computer system 12 may include the polling component 64, a main database 74, and an administrative console 78 that includes a user interface to define the unauthorized software items (see FIG. 10). The polling component 64 includes a comparator component 90 and a uninstall component 92. The comparator component 90 operates to poll an account package 94 in an account package table 84 to identify when the automated uninstall service component is ready to run by prompting the inventory module 60, on the managed computer system 18, to generate and report the software inventory list to the comparator component 90.

The uninstall component 92 may be invoked to get an uninstall package 96 from an uninstall package library 98 and send the uninstall package 96 to the uninstall module 50 on the managed computer system 18. The comparator component 90 and the uninstall component 92 operate together on the management computer system 12 to drive and orchestrate the uninstalling of the unauthorized software items 88 on the managed computer system 12. The uninstall package 96 may, for example, be a custom uninstall package or a generic uninstall package as shown in FIG. 4 and described more fully below.

The exemplary administrative console 78 may be utilized by a user for entering commands in the form of a script including business logic, or rules to create a software reference list that is included in a software reference list library 100 (see FIG. 5) or to schedule the uninstall of unauthorized software items. Scripts can be scheduled to run periodically, at a predetermined time, or at will.

Figure 6:
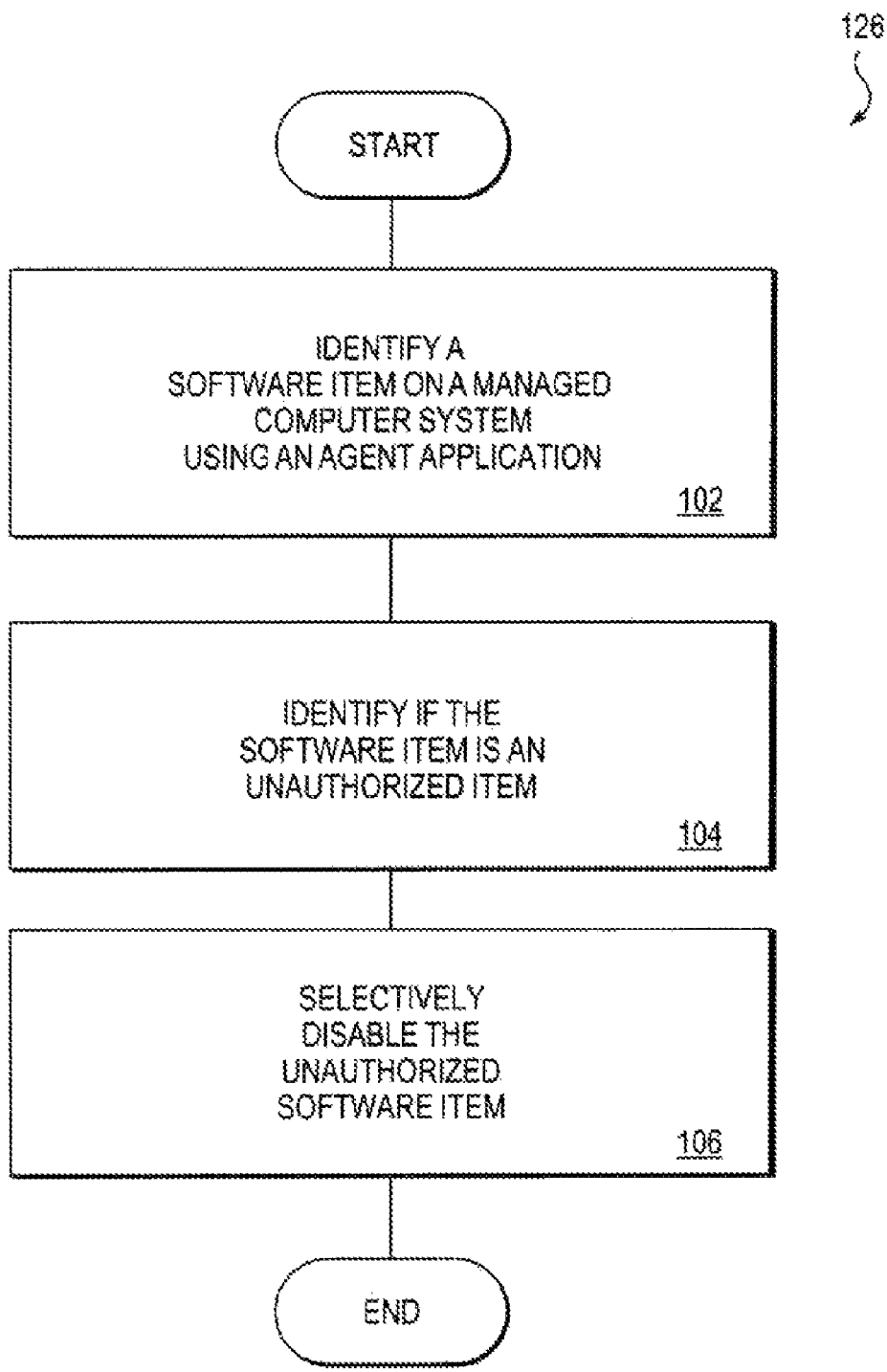
FIG. 6 is a flow chart illustrating a method, according to an exemplary embodiment of the present invention, to automatically uninstall unauthorized software from a managed computer system.

FIG. 6 is a flow chart illustrating a method 126, according to an exemplary embodiment of the present invention, to automatically uninstall unauthorized software on the managed computer system 18 of the system 86. At box 102, all software items on the managed computer system 18 are identified by the inventory module 60 executing under the agent application 42. The agent application 42 may run in response to receiving a request from the management computer system 12. An alternate embodiment may include the agent application 42 executing instructions in the inventory module 60 on the managed computer system 18 in response to local scheduling without being prompted from the management computer system 12.

At box 104, any unauthorized software items 88 are identified from the software inventory list generated by the management computer 12. In one embodiment, the software item included in the software inventory list may be unauthorized if it appears on a disallow list. In another embodiment, the software item may be identified as unauthorized when it does not appear on an allow list (e.g., a software reference list) that is associated with the managed computer system 18 (see FIG. 7). The unauthorized software item 88 may be any distinguishable software that is present on or accessible through the managed computer system 18. This includes executable files (.exe files), software applications (e.g., Morpheus, gaming applications or this like), configurable files, multimedia files (audio files such as MP3 files and/or video files such as JPEG files), drivers, or any recognizable software that may be identified through or present on the managed computer system 18. Further, it will be appreciated that identification of unauthorized software items may be performed by an identification unit that in one embodiment may execute at the management computer system 12 and in another embodiment may execute at the managed computer system 18.

At box 106, the software items that have been identified as unauthorized are selectively disabled (e.g., uninstalled) from the managed computer system 18. In order to do so, the management computer system 12 may push the uninstall package 96 to the managed computer system 18 which prompts the removal of the unauthorized software item 88 on the managed computer system 18. In one embodiment the management computer system 12 defines a disable unit which disables. In another embodiment the managed computer system 18 may disable.

In one exemplary embodiment, the tables that are relevant to the automated uninstall service may include the account packages table 84, the registry asset information table 80, the software reference list library 100 and the uninstall package library 98 as shown in FIG. 4. The account packages table 84 may include information regarding scheduling of the automated uninstall service in the form of an account package 94.

The registry asset information table 80 includes an entry for each managed system 12 (e.g., a hardware asset) that is associated with an account. Fields for a particular managed system 12 further include an exemplary job responsibility 108 of the identified user (e.g., identified by the FirstName, LastName, fields) of the managed system 12 and a software reference list identification 110 that identifies a software reference list that identifies unauthorized software items for the managed computer 12.

The software reference list library 100 includes an exemplary software reference list in the form of a collection of software reference lists 112. Each software reference list 112 includes named software items (e.g., an Active Disk 114), a software reference list identification 110 and an allow/disallow flag 116. The allow/disallow flag 116 indicates whether the named software items are allowed or disallowed. Further, the software reference list 112 may be linked to the registry asset information table 80 via the software reference list identification 110. Thus, multiple managed systems 18, as registered in the registry asset information table 80, may reference a single software reference list 112.

The uninstall package library 98 includes an exemplary uninstall package 96. Each uninstall package 96 is identified with a software item identification 118. The uninstall package 96 is used to uninstall one or more unauthorized software items 88 that are associated with the software item identification 118.

Figure 9:
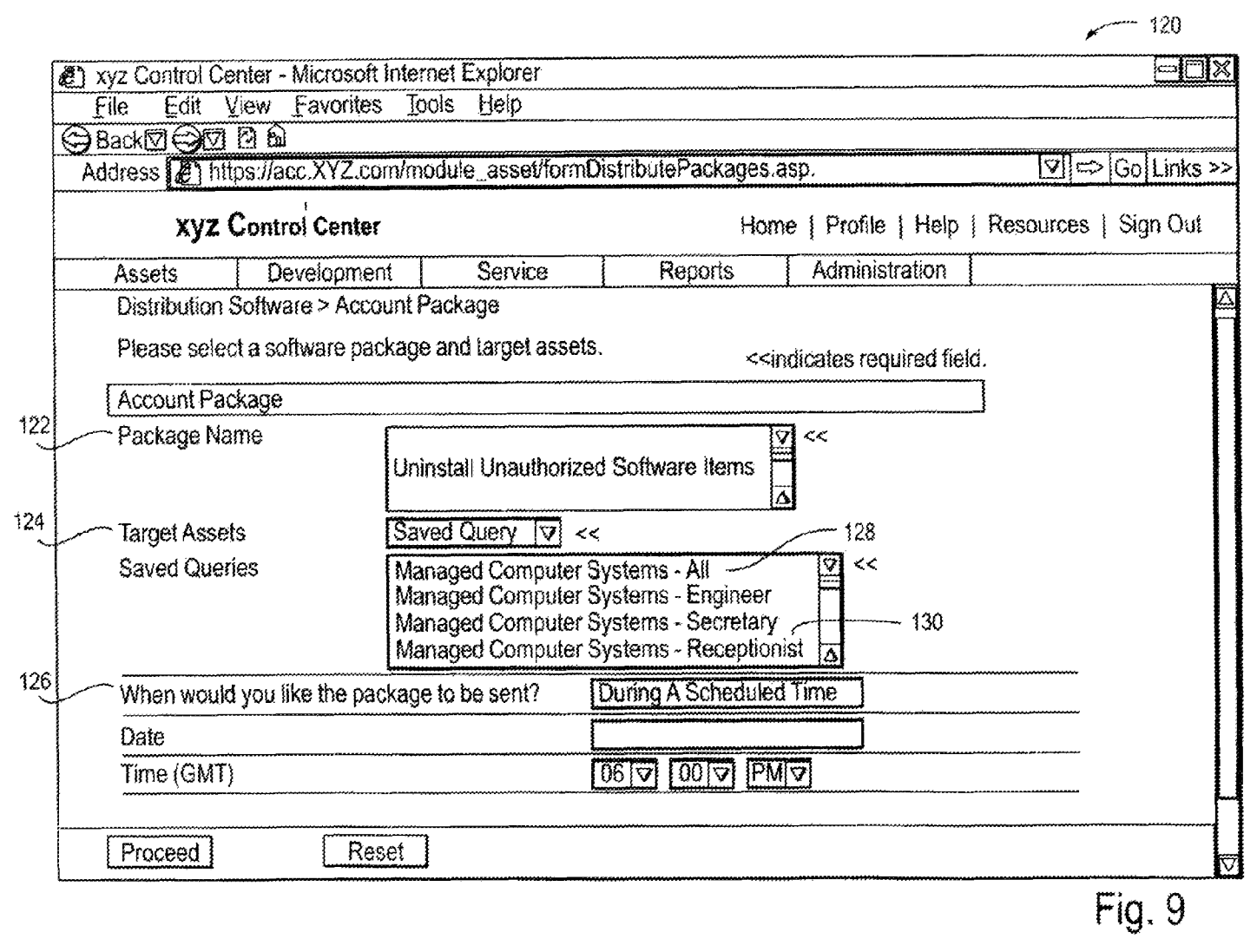

FIG. 9 illustrates an exemplary user interface 120 to create/edit an account package 94. A user may create the account package 94 by identifying a package name 122, identifying target assets 124, and entering a scheduled time 126. The targeted assets (e.g. managed computer system 18) may be identified with a previously saved query 128. For example, a user may identify managed computer systems 18 that are operated by users with the job responsibility of "receptionist" by selecting a saved query 130. Other illustrated queries identify "All" computer systems and computer systems operated by users with job responsibilities of "Engineer" and "Secretary." Additional queries may be constructed from the admin console 78 for any grouping of the managed computer system 18 (e.g., the managed computer systems 18 located in a particular place, included in a company division, including other hardware or software assets, etc.).

FIG. 10 illustrates an exemplary embodiment of a user interface 132 to create/edit a software reference list. A user utilizes the user interface 132 to identify unauthorized software items 88 on the managed computer system 18. The software reference list may be identified as an allow list with a selection button 134 or as disallow list with a selection button 136.

A software reference list window 138 identifies a list of the software items by name. The user adds the title of the software item to the software reference list window 138 by selecting a software title in a software titles window 140 and selecting an add item button 142. The software titles list window 140 is created by the system inventory service and includes the names of all software items present on the managed computer systems 18. The user may enter the name of a software item that does not appear in the software titles window 140 by typing the name of the software item in an input box 146. Thus, the user adds software titles to the software reference list window 138 with the add item button 142 or by inputting the title of the software title with the input box 146.

The software reference list is associated with a group of "Targeted Assets" (e.g., managed computer systems 18) via a targeted assets screen item 148. The screen item 148 enables the user to identify the managed computer systems 18 with previously created queries that appear as saved queries 150 on the screen. For example, all managed computer systems 18 that are operated by a person with a job responsibly of secretary are identified by saved query 152. Other examples might include the managed computer systems 18 operated by engineers, or receptionists, etc. It will be appreciated that queries may be configured or created for a targeted group based on any information associated with the managed computer system 18 (e.g., located in a particular zip code, included in a related corporate entity, used by personal with multiple job responsibilities, etc.).

Figure 7:
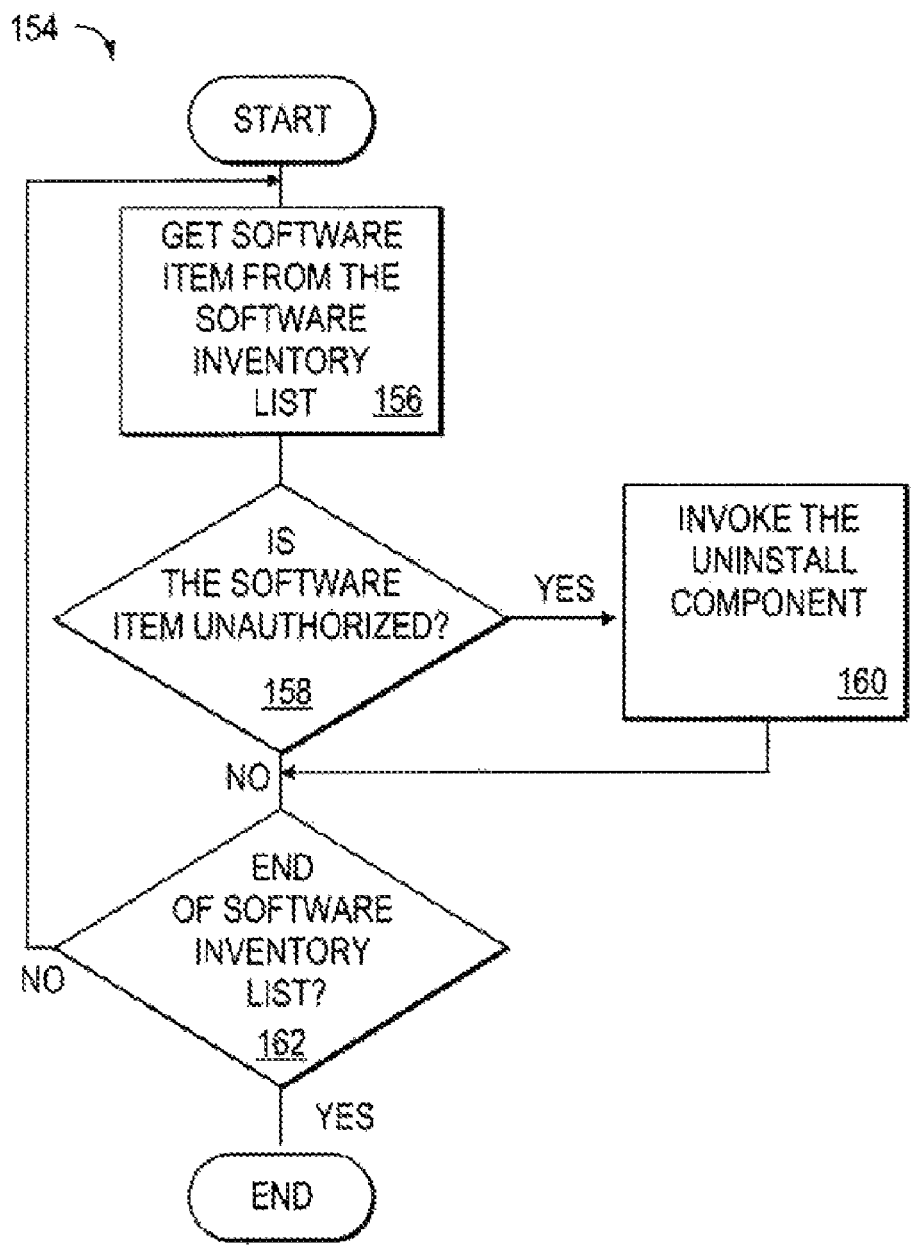
FIG. 7 is a flow chart illustrating a method, according to an exemplary embodiment of the present invention, to compare current software items in a software inventory list with a software reference list.

FIG. 7 is a flow chart illustrating a method 154, according to an exemplary embodiment of the present invention, to facilitate comparison of software items listed on the software inventory list with software items that are listed on a software reference list. At box 156, the comparator component 90 gets the software item from the software inventory list.

At decision box 158, the comparator component 90 determines if the software item is unauthorized by comparing the software item 88 against the software reference list. If the software item does not appear on the software reference list (i.e., an allow list), then the software item is not allowed and a branch is made to box 160. Otherwise, a branch is made to decision box 162. At box 160, the comparator component 90 invokes the uninstall component 92, which is described further below. In an alternative embodiment the software reference list may take the form of a disallow list. In this embodiment the uninstall component is invoked if a software item on the software inventory list appears on the disallow list.

At decision box 162, the comparator component 90 determines if the end of the software inventory list has been reached and branches to box 156 if the end has not been reached. Otherwise, the method ends.

Figure 8:
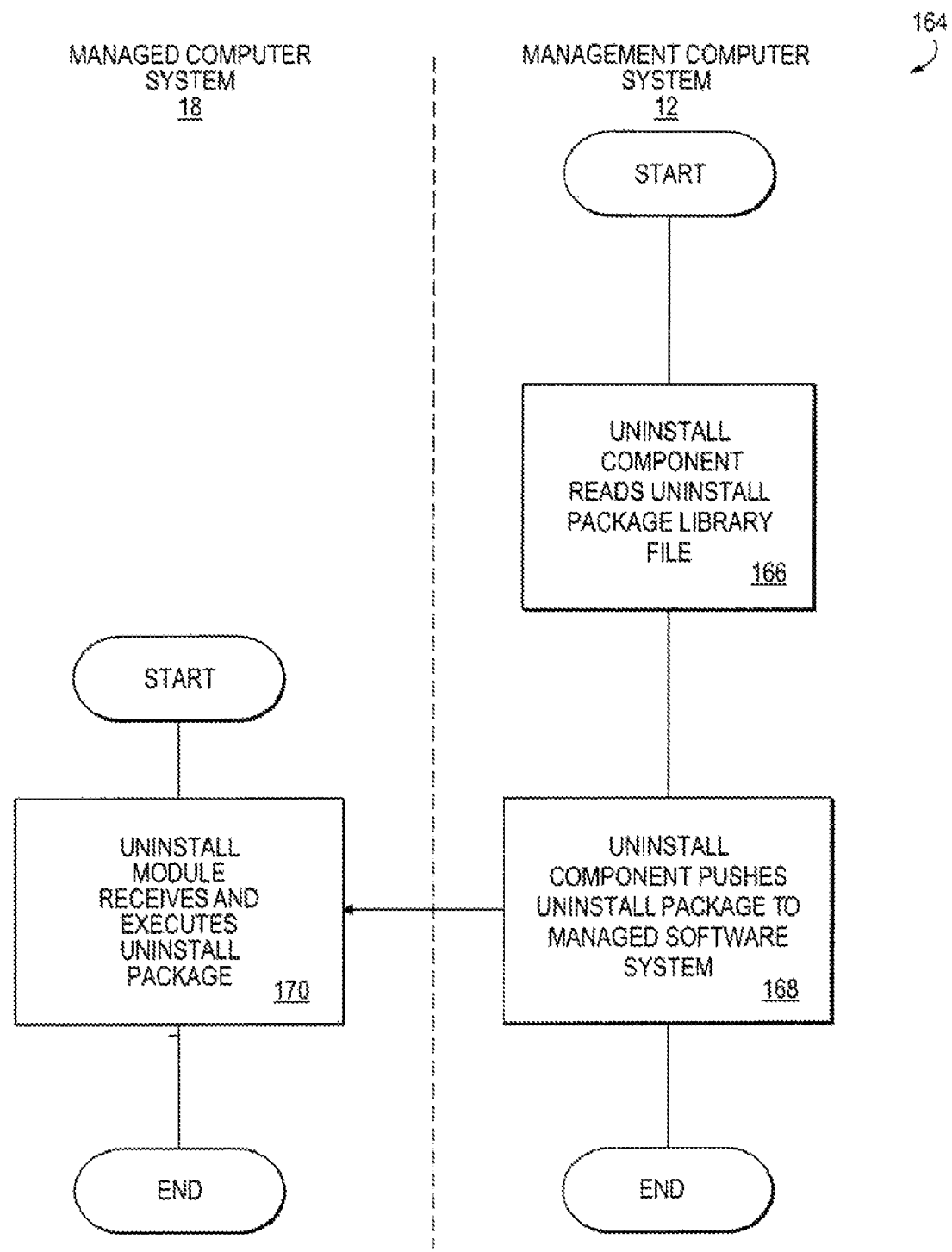
FIG. 8 is a flow chart illustrating a method, according to an exemplary embodiment of the present invention, to selectively disable the unauthorized software item.

FIG. 8 is a flow chart illustrating a method 164, according to an exemplary embodiment of the present invention, to facilitate selectively disabling the unauthorized software item 88.

At block 166, the uninstall component 92 reads the uninstall packages library file 98. The uninstall component 92 has been invoked with a specific software item identification 98. The uninstall component 92 reads the uninstall package library 98 with the software item identification 98 as a key and extracts the appropriate uninstall package 96 for the unauthorized software item 88.

At block 168, the uninstall component 92 pushes the uninstall package 96 to the managed software system 18. It will be appreciated that an alternate embodiment of the present invention may include an uninstall package library 98 resident on each managed computer system 18. In this embodiment, the uninstall package library 98 would be distributed by the management computer system 12 to the managed computer systems 18 on a demand or scheduled basis.

At box 170, the uninstall module 50 at the managed computer system 18 receives the uninstall package 96. The uninstall module 50 executes the uninstall package 96 to disable the associated unauthorized software item 88. The uninstall package 96 may direct the uninstall module 50 to disable the unauthorized software item 88 by deleting the software item, reconfiguring a parameter in the unauthorized software item 88 (e.g., a table) or modifying the unauthorized software item 88 or its environment in a way that disables the unauthorized software item 88.

The uninstall package 96 may be embodied as a generic uninstall package or a custom uninstall package. The generic uninstall package is capable of uninstalling most unauthorized software items 88. For example, unauthorized software items 88 installed by the Microsoft™ installer and registered to the operating system and that appear in the add/remove applet inside the Windows Operating System control panel may be removed with the generic uninstall package. Other unauthorized software items 88 that cannot be disabled with the generic uninstall package may be uninstalled with the custom uninstall package.

Figure 11:
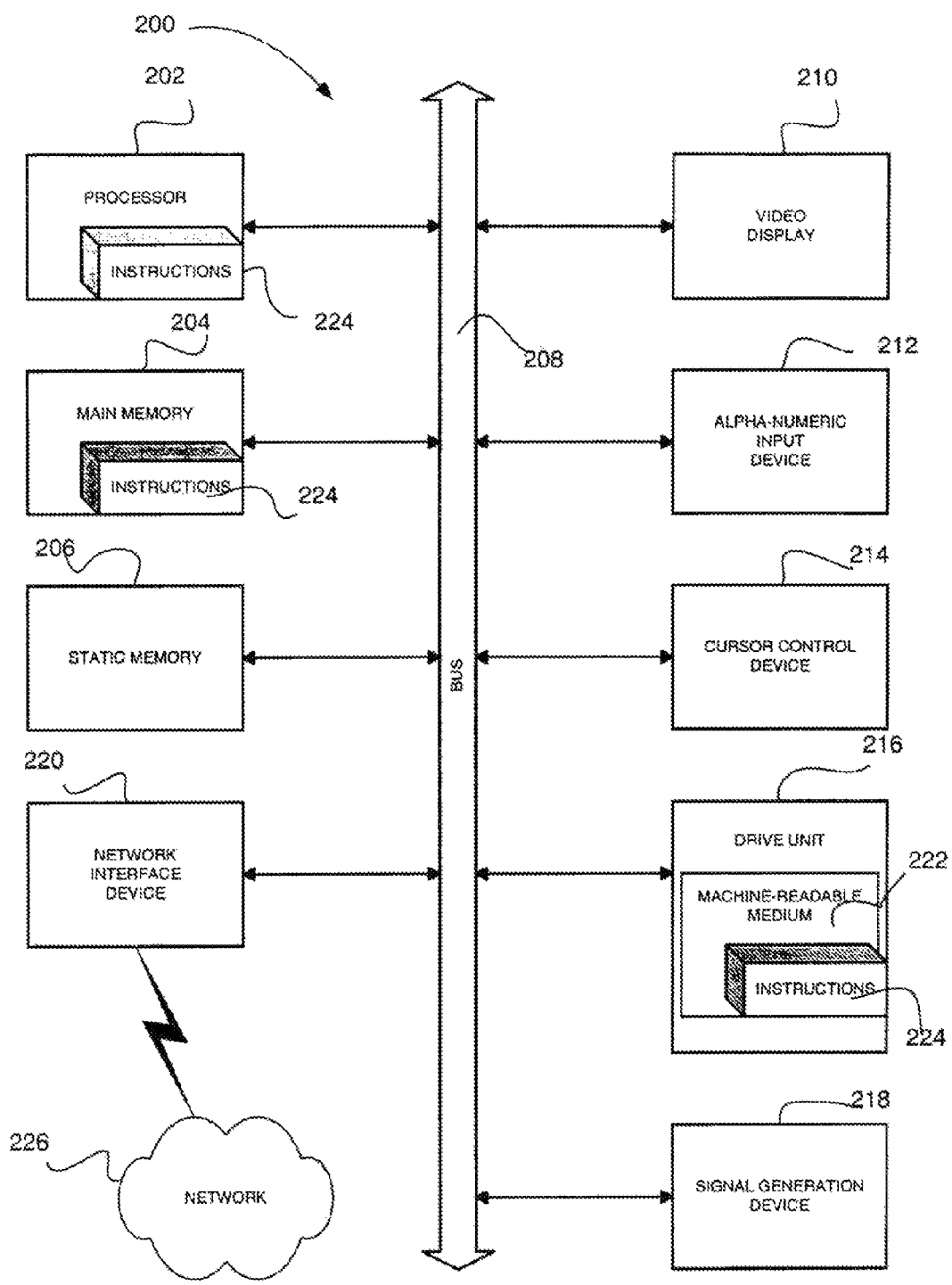
FIG. 11 shows a diagrammatic representation of a machine in the exemplary form of a computer system within which a set of instructions, for causing the machine to perform any one or more of the methodologies discussed herein, may be executed.

FIG. 11 shows a diagrammatic representation of a machine in the exemplary form of a computer system 200 within which a set of instructions, for causing the machine to perform any one or more of the methodologies discussed herein, may be executed. In alternative embodiments, the machine operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alpha-numeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying anyone or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and a system for uninstalling an unauthorized software item from a managed computer has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A management computer system, to manage at least one current software item on a managed computer system, the management computer system comprising:
    a processor and memory executing instructions for:
    a user interface to define a software reference list identifying unauthorized software items, the user interface operable to display software items in a display window and to receive an allow input from a user to identify if a software item is authorized on the managed device, and receive a disallow input from a user to identify if a software item is unauthorized on the managed device;
    a communication interface to receive from the managed computer system a plurality of current software item identifiers that identify current software items on the managed computer system;
    a comparator component to compare each of the current software item identifiers with the software reference list to identify that the current software item is an unauthorized software item; and
    an uninstall component to identify an uninstall package of a plurality of uninstall packages, the identified uninstall package being associated with the unauthorized software item and wherein the identified uninstall package is communicated to the managed computer system, in an automated fashion, to uninstall the unauthorized software item.

2. The management computer system of claim 1, further comprising an administrative console to provide the user interface at the management computer system to receive input to define the software reference list.

3. The management computer system of claim 1, wherein the software reference list corresponds to a job responsibility that is associated with a user of the managed computer system.

4. The management computer system of claim 3, wherein the user interface provides a plurality of user selectable job descriptors that each identifies a job responsibility.

5. The management computer system of claim 1, wherein the software reference list comprises a list of software items that are authorized to be on the managed computer system.

6. The management computer system of claim 1, wherein the software reference list comprises a list of software items that are not authorized to be on the managed computer system.

7. The management computer system of claim 1, wherein the unauthorized software item comprises one of an executable file, a configuration file, a driver, or a media file.

8. The management computer system of claim 7, wherein the uninstall package is communicated to the managed computer system at a scheduled time.

9. A method of managing at least one current software item on a managed computer system using a management computer system, the method comprising:
    at the management computer system, providing a user interface to define a software reference list identifying unauthorized software items;
    displaying software items in a display window;
    receiving an allow input from a user to identify if a software item is authorized on the managed computer system;
    receiving a disallow input from a user to identify if a software item is unauthorized on the managed computer system;
    receiving from the managed computer system a plurality of current software item identifiers that identify current software items on the managed computer system;
    comparing each of the current software item identifiers with the software reference list to identify that the current software item is an unauthorized software item;
    identifying an uninstall package of a plurality of uninstall packages, the identified uninstall package being associated with the unauthorized software item; and
    communicating the identified uninstall package to the managed computer system, in an automated fashion, to uninstall the unauthorized software item;
    uninstalling the unauthorized software item with the uninstall package.

10. The method of claim 9, further comprising communicating the uninstall package to the managed computer system at a scheduled time.

* * * * *